INVENTOR.
HENRY W. BOTELER
BY David D. McKenney
ATTORNEY

FIG. 4

Oct. 29, 1968   H. W. BOTELER   3,407,838
PLASTIC LINED VALVE
Filed Jan. 12, 1966   7 Sheets-Sheet 4

INVENTOR.
HENRY W. BOTELER
BY David W. Kenney
ATTORNEY

Oct. 29, 1968  H. W. BOTELER  3,407,838
PLASTIC LINED VALVE

Filed Jan. 12, 1966  7 Sheets-Sheet 6

FIG. 6

INVENTOR.
HENRY W. BOTELER

BY David O. McKenney
ATTORNEY

FIG. 8

United States Patent Office 3,407,838
Patented Oct. 29, 1968

3,407,838
PLASTIC LINED VALVE
Henry W. Boteler, East Greenwich, R.I., assignor to Grinnell Corporation, Providence, R.I., a corporation of Delaware
Filed Jan. 12, 1966, Ser. No. 520,220
1 Claim. (Cl. 137—375)

ABSTRACT OF THE DISCLOSURE

A body for a diaphragm valve of the weir type in which the outer body casing is formed of one material, in which the interior walls of this casing are covered with a liner of a different material, in which an elongated integral extention of said liner is anchored in a special duct through a boss, and in which the boss is located in the centrally located depression created in the outer casing surface by the presence of the weir.

Each diaphragm valve of the kind to which the present invention relates includes an elongated body member having inlet and outlet openings at its opposite ends and having a flow passage which extends between these openings and which is defined by interior surfaces of the body member walls. A large "diaphragm" opening extends through these walls on one side of the body member for communication with the flow passage. This opening is surrounded by a rim surface on the body member and is covered by a flexible diaphragm. The peripheral portion of this diaphragm is clamped to the rim surface by a bonnet member, and the central, unclamped, portion of the diaphragm is domed so as to be movable into and out of the flow passage through the diaphragm opening. The valve actuating mechanism is housed in the bonnet on the side of the diaphragm which is opposite the opening and includes a compressor which achieves valve closing by moving the domed diaphragm portion against a seat. This seat is formed on those interior surfaces of the body member walls which are opposite the diaphragm opening. The compressor achieves valve opening by moving the domed diaphragm portion away from the seat and out of the diaphragm opening.

Metal is the most popular material for forming diaphragm valve bodies. A metal body will withstand the pressure of the controlled fluid better than other materials of comparable cost. It will also better withstand the clamping forces caused by the mounting of the bonnet on the body and by the installation of the valve in a pipe line. Even when the controlled fluid is one which attacks metal the above-mentioned advantages can still be enjoyed by providing a metal body casing in which the flow passage therethrough is lined with a layer of corrosion resistant material. The smooth flow passage contours which are characteristic of diaphragm valve bodies readily lend themselves to such lining.

In many cases these body linings have been formed of thermoplastic applied to the body casings by injection molding techniques. The plastic is heated to a soft flowable state (plasticized) and forced under pressure into liner spaces defined by the interior casing surfaces and special mandrel cores temporarily located within the casing passage and openings thereto.

However, in the prior art use of these injection molding techniques a difficulty has arisen from the fact that the soft plastic has been introduced into the liner spaces through passages or gates in the mandrels. When such injection is completed and the plastic has cooled and hardened, the portion of the plastic remaining in the gates has had to be separated from the liner in order to remove the mandrels. This separation has been accomplished by exerting on the mandrel containing the gate enough removal force to break the plastic therein from the plastic liner. This break has always occurred adjacent a "functional" liner surface, because any injection passage through a mandrel will, of necessity, join the liner at a surface thereof which is later exposed to fluid flow or to clamping action of the bonnet or pipe. For example, it has been common practice to have the mandrel gate open into the liner at a surface portion thereof which comprises a part of the diaphragm seating or at a surface portion which comprises the flow passage walls on either side of such seating. At other times in the prior art the gate through a mandrel has opened into the liner at the surface portion thereof which extends over the diaphragm opening rim or over an end opening flange.

Breaking the plastic extension from such a surface of the plastic liner has had a number of disadvantages. First, the force required to remove the mandrels, which is already substantial because of the tendency of the cooled plastic to grip the mandrel surfaces, has had to be increased merely to achieve such breaking. Second, each such break causes an interruption in the plastic "skin" which is characteristic of many thermoplastics. This "skin" occurs right at the surface of the plastic and, in many of these materials, has a wear resistance and imperviousness superior to the plastic beneath the surface. These properties of the "skin" are probably the result of its more rapid cooling. In any event the plastic exposed at the break does not stand up as well in service. Third, the break in the plastic is always rough, necessitating subsequent grinding when it is above the adjacent surface level and resulting in an irreparable cavity if any part of it extends below the adjacent surface level.

The present invention solves all these difficulties by providing a lined diaphragm valve body formed of a casing of one material and liner of another material and having gate passages which are right in the casing and are filled with liner material. With such a construction the liner material in the passages joins this material in the liner at a nonfunctional surface thereto, and need never be separated therefrom. As a result the "functional" plastic liner surfaces are not marred by any areas from which extensions have been separated.

One feature of this arrangement is that the injection passages and any extra casing enlargements required by them can be accommodated particularly well at a central location in the body casing, and the inlet ends of such injection passages can be readily provided with special surfaces for receiving the nozzle of an injection molding machine. Thus, in those diaphragm valves in which the seating is formed on a high weir by far the most preferred embodiment of the present invention is that in which the gate is located in a special boss formed on the casing exterior between sloping sides of the weir. Since the weir usually represents the center of the body, the plastic can flow equal distances in opposite directions from the passage outlet or outlets, and the intrusion of the weir part way across the flow passage provides a fold in the underside of the casing accommodating this boss without increasing the overall body dimensions. The boss in this location also doubles as a reinforcement.

The present invention also solves the earlier described difficulties by providing a novel method of applying plastic liners to diaphragm valve body casings by introducing the liner material into the casings through gates formed in the casings themselves rather than through gates in the mandrels which, with the casing, form the liner receiving cavities.

Accordingly it is an object of the present invention to provide a lined diaphragm valve body in which the functional surfaces of the liner are free from any areas where integral extensions were separated from the liner itself.

Another object is to provide a diaphragm valve body of the kind described in which the body has an outer casing of one material with an injection passage therethrough, in which the casing has surface covered by a liner of a different material and in which an integral neck of liner material lying in the passage anchors the liner to the casing.

Another object is to provide a diaphragm valve body of the kind described in which the body has a metal casing with an injection passage therethrough, in which the liner is a thermoplastic and in which the liner has an extension completely filling the injection passage.

Another object is to provide a diaphragm valve body of the kind described in which the passage lies in a special casing boss and extends therethrough from the exterior casing surface to the interior casing surface.

Another object is to provide a diaphragm valve body of the kind described in which there is a special surface on the exterior of the casing for receiving the nozzle of an injection molding machine.

Another object is to provide a diaphragm valve body of the kind described in which the diaphragm seating is formed on a weir and in which the injection passage is located at such weir.

Another object of the present invention is to provide a method of lining a diaphragm valve body casing by locating mandrels within said casing to define therewith a liner cavity and by injecting the lining material through a casing passage and into such liner cavity.

Another object is to provide a method of the kind described in which the liner cavity is a generally symmetrical space and the liner material is injected thereinto near the center thereof.

Other objects will appear hereinafter.

The best mode in which I have contemplated applying the principles of the present invention are shown in the accompanying drawings, but these are to be deemed primarily illustrative for it is intended that the patent shall cover by suitable expression in the appended claim whatever of patentable subject matter resides in the invention disclosed.

Figure 1:
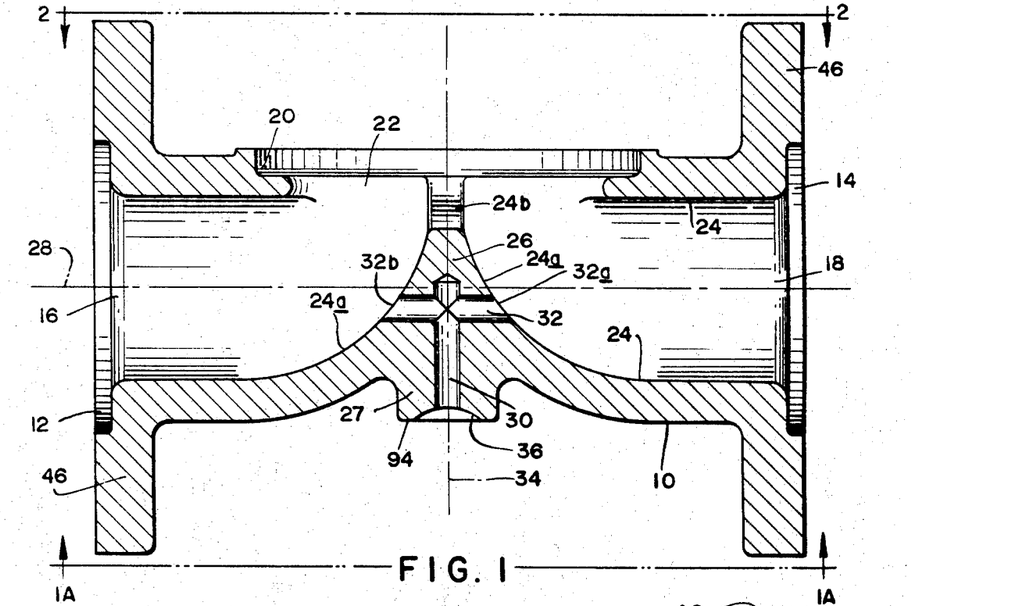
FIGURE 1 is a cross-sectioned side elevation view of a metal body casing which is in accordance with the present invention, which has been formed to receive a plastic liner, but to which the plastic liner has not yet been applied.
Figure 1A:
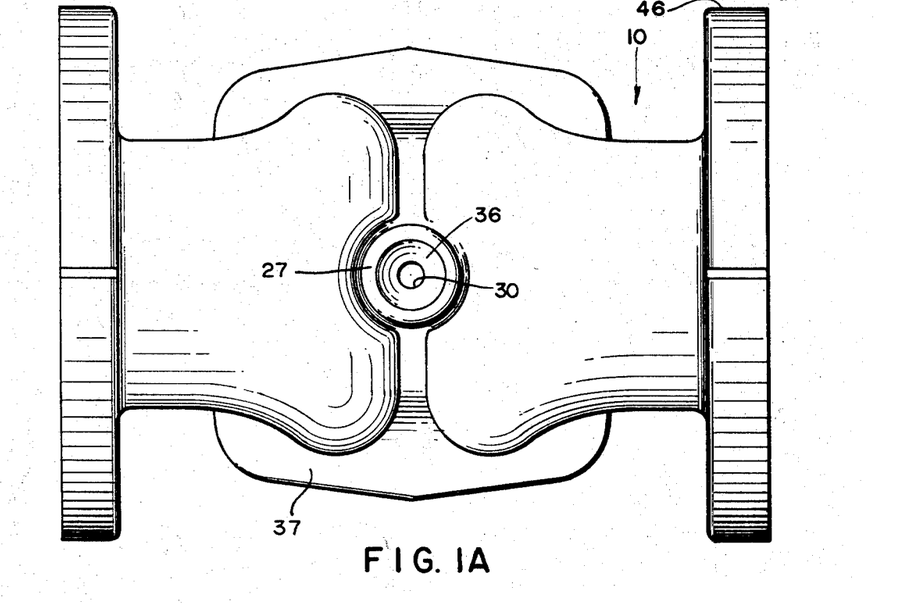
FIGURE 1A is a bottom plan view taken on line 1A—1A of FIG. 1.
Figure 2:
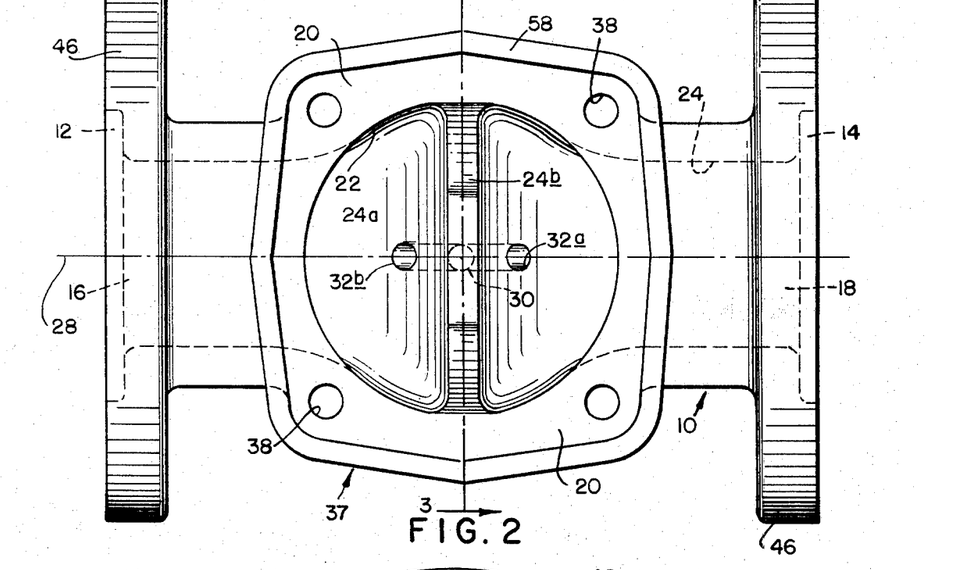
FIGURE 2 is a top plan view taken on line 2—2 of FIG. 1.
Figure 3:
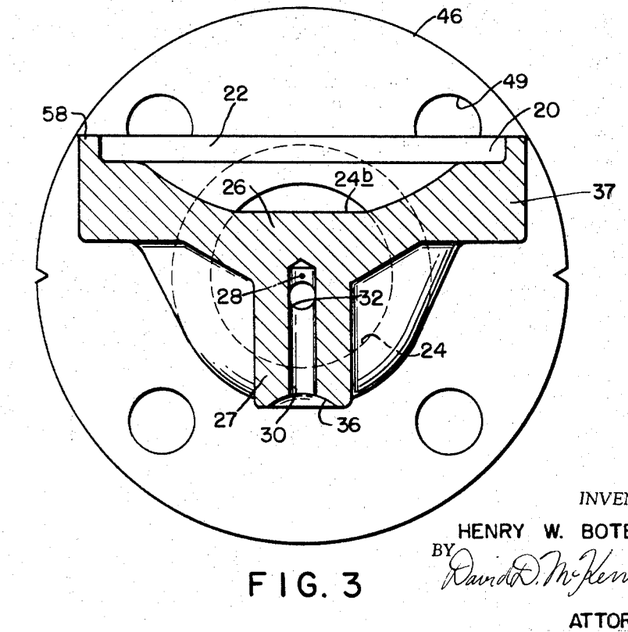
FIGURE 3 is a cross-sectioned end elevation view taken on line 3—3 of FIG. 2.

Referring now more particularly to the drawings, FIGS. 1 to 3 show a typical metal diaphragm valve body casing 10 which has been formed (usually cast) with annular recesses 12 and 14 around its end openings 16 and 18, with a corresponding annular recess 20 around its diaphragm opening 22 and with interior wall surfaces 24 of large enough dimensions so that when a plastic liner (not shown in FIGS. 1 to 3) has been applied to those interior wall surfaces 24 the interior surfaces 25 of such plastic liner (see FIGS. 6 to 8) define a flow passage of the desired dimensions.

The body casing of FIGS. 1 to 3 is for use in a valve in which the diaphragm seat is located on a weir 26 integral with the body casing and on the side thereof opposite the diaphragm opening 22. As shown in FIGS. 1 to 3 this weir constitutes a dam extending part way into the flow path with a narrow concave top surface 24b lying across the diaphragm opening 22 at right angles to the common axis 28 of the end openings. The relatively gradual slope of the casing wall sides 24a and the uniform thickness of the casing walls provides a fold in the underside of the casing which is occupied by an integral boss 27. This boss is large enough to accommodate a system of passages 30 and 32 connecting the exterior of the casing with its interior walls 24. Passage 30 is substantially right angles to the axis 28, is coincidental with the axis 34 of the diaphragm opening 22 and is surrounded at its outer end by a nozzle receiving surface 36. The inner end of passage 30 is blind and intersected by the passage 32 which is parallel to axis 28 and communicates with the casing interior surfaces 24 through openings 32a and 32b in the sloping weir sides 24a.

FIG. 2 shows that the flange 37 around diaphragm opening is provided with holes 38 which are threaded to receive bolts 40 (see FIG. 6) clamping together the bonnet 42, diaphragm 44 and lined casing 10. FIGS. 1 to 3 all show the casing end flanges 46 by which the valve is mounted in a pipe line 27 (see FIG. 6). Nut and bolt assemblies 48 pass through openings 49 in these latter flanges and in corresponding flanges 82 on the pipe ends.

Figure 4:
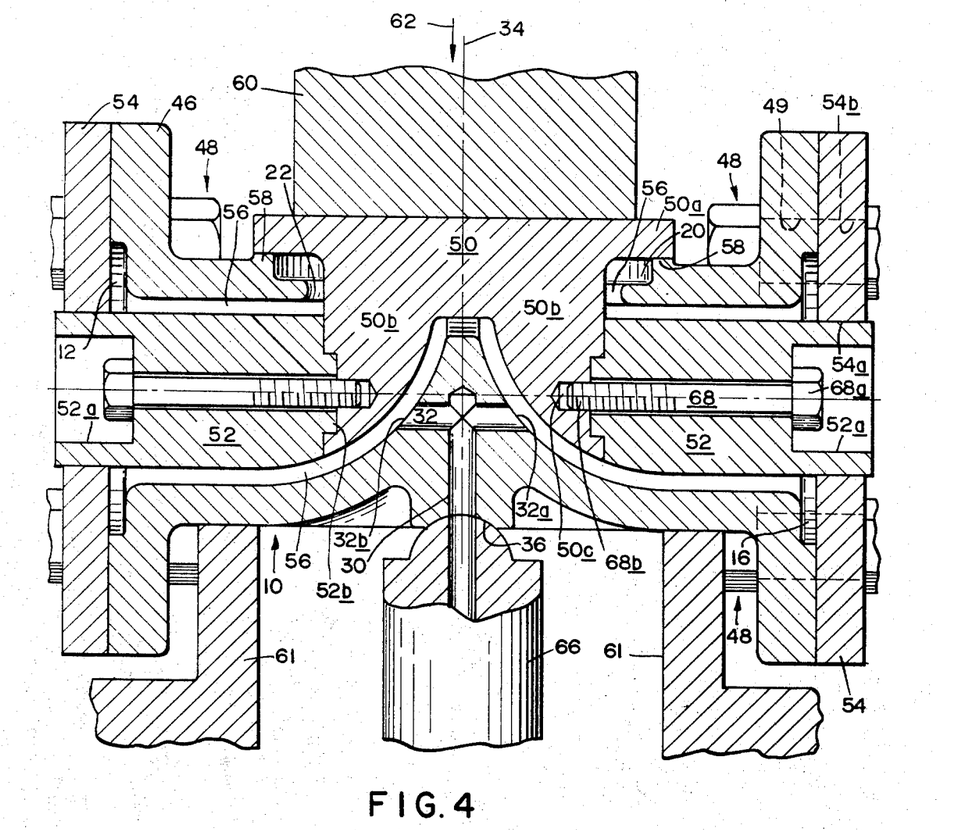
FIGURE 4 is a view like FIG. 1, but showing the casing assembled with mandrels and the assembly located in an injection molding machine preparatory to the injection of the plastic.

In FIG. 4 the metal body casing 10 is fitted with mandrels 50, 52 and 54 preparatory to the injection of the thermoplastic liner material. For a better understanding of their shape, these mandrels are shown in perspective and apart from the body casing in FIG. 5. This view reveals that mandrel 50 is comprised of a plate portion 50a, generally matching casing flange 37, and of a pair of integral protruding portions 50b shaped to extend into the metal body casing below the diaphragm opening. The plate portion 50a engages a lip 58 on the body casing flange 37 around recess 20. The remainder of mandrel 50 is spaced from the casing walls to define therewith liner cavities 56.

Members 60 and 61 in FIG. 4 represent fixtures for mounting the casing and mandrel assembly in an injection molding machine. Holding force is exerted by this machine in the direction indicated by arrow 62. Once mounted in the machine a nozzle 66 is advanced against the body surface 36 and forms a tight connection with the passage 30.

Figure 5:
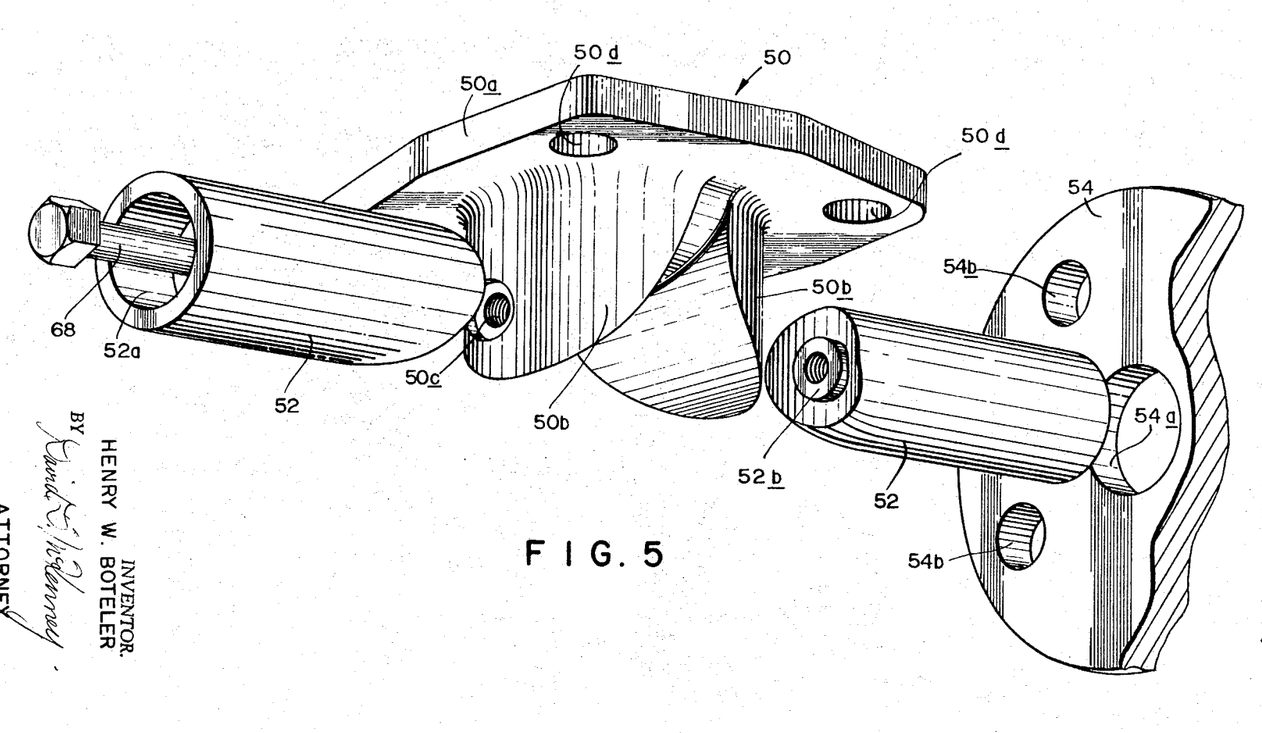
FIGURE 5 is a partly exploded perspective view of the mandrels alone.

Mandrels 52 and 54 are the same at both ends of the valve. The former has its inner end contoured to fit snugly against the face of the adjacent mandrel portion 50b and is secured thereto by a bolt 68 which has its head 68a engaging the bottom of an end recess 52a and its threaded end 68b turned into a threaded opening 50c. A small aligning lip 52b on mandrel 52 fits into a cooperating countersunk part of opening 50c to exactly locate mandrel 52 with respect to mandrel 50.

Mandrel 54 is simply a plate having an opening 54a to receive the outer end of mandrel 52 and having bolt holes 54b registering with the holes 49 in the casing end flanges 46. Bolt and nut assemblies like 48 employ holes 54b–49 to secure the mandrels 54 to these casing flanges.

As FIG. 4 shows particularly well, the mandrels 50, 52 and 54 and the casing 10 define the cavities 56 into which the plastic is to be injected through the passages 30 and 32. This plastic, which is plasticized in the injection molding machine (such machines are well known in this art), is introduced into these passages through nozzle 66 under sufficient pressure to completely fill cavities 56 and, in the process, completely fill passages 30 and 32. Air in these cavities and passages escapes through the crevices which inevitably occur between the mandrels and the body and which are too small to permit the flashing of any significant amounts of the plastic.

Figure 4A:
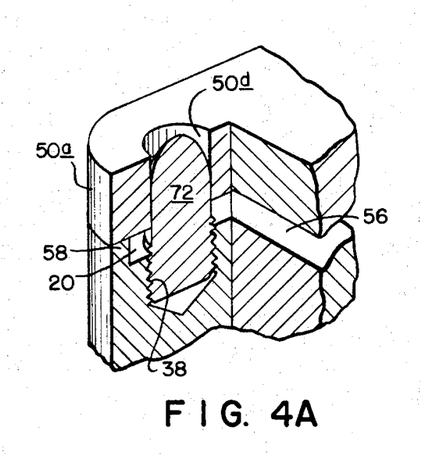
FIGURE 4A is a cross-sectioned perspective view of a fragment of the diaphragm opening flange on the casing end of the mandrels associated therewith.

FIG. 4A shows that mandrel 50 is properly aligned with the metal body casing 10 by the use of tapered aligning pins 72 threaded into the casing holes 38 and receiving corresponding openings 50d in the mandrel plate portion 50a. These pins also prevent the plastic in recesses 20 from entering casing holes 38 and interfering with the threads thereof. After the plastic cools and hardens the pins 72 are removed.

Figure 6:
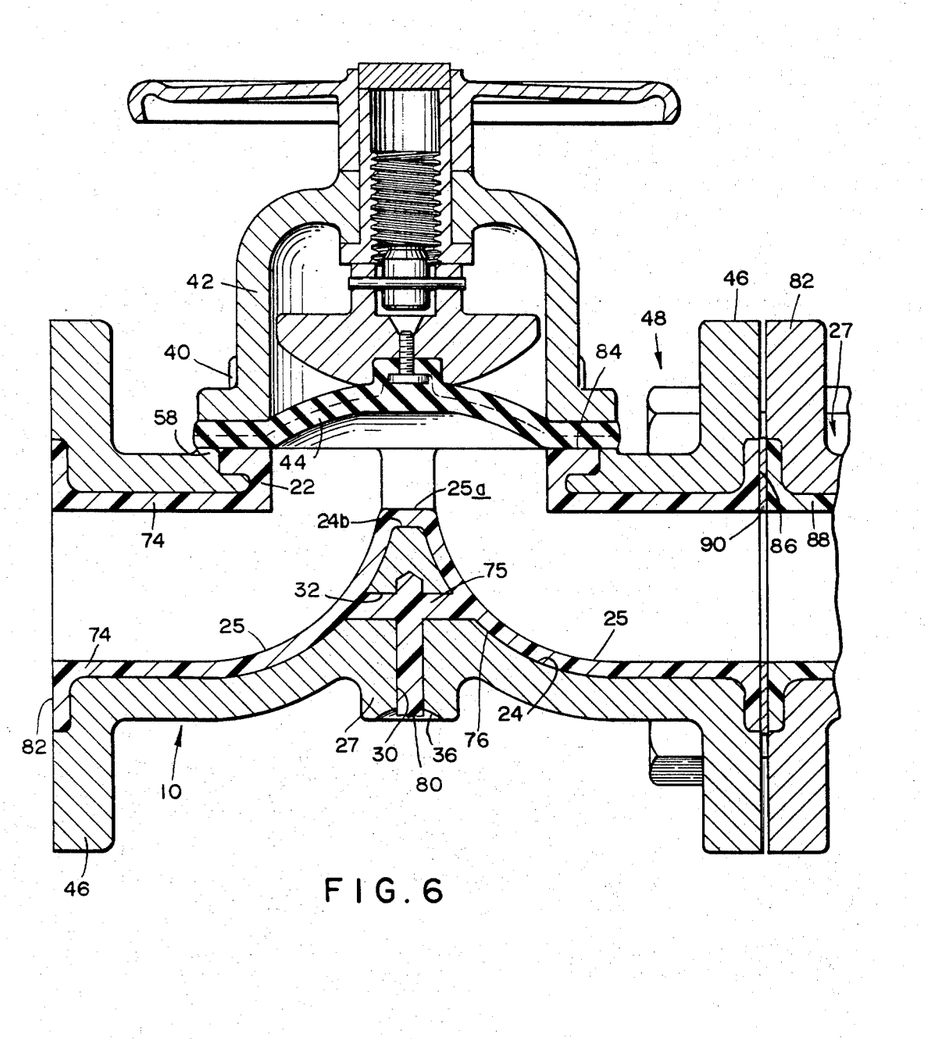
FIGURE 6 is a view like FIG. 1, but showing the plastic lining in place to complete the body and showing the remaining valve parts assembled with this body, the valve being in the open position.
Figure 7:
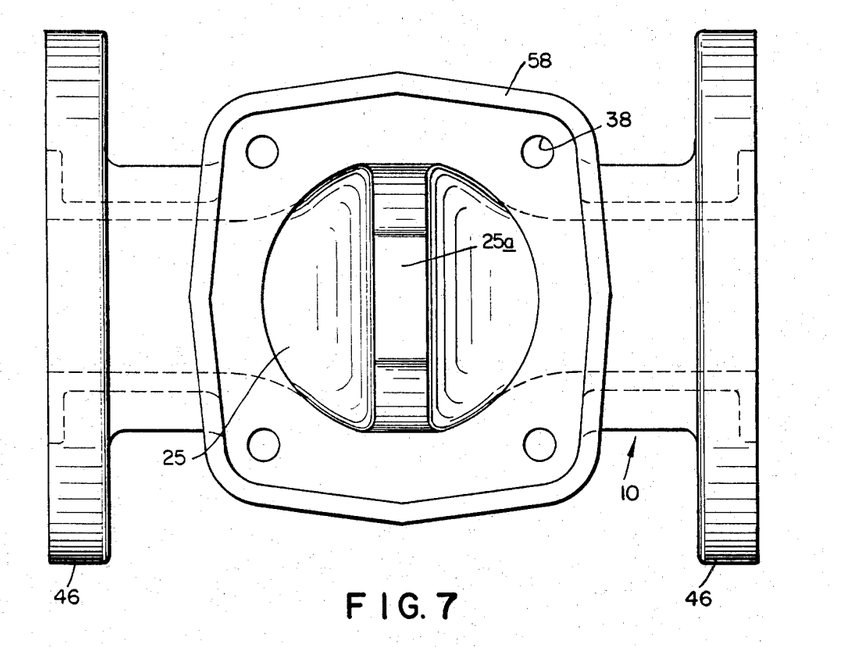
FIGURE 7 is a view like FIG. 2 but showing the plastic lining in place to complete the body.

FIG. 6 shows the lined body casing assembled with other valve parts to form a completed valve and reveals particularly well that the cooled and hardened plastic 74 fills the passages 30 and 32 and integrally joins the liner at a back, or "nonfunctional," side 76 thereof. Thus the plastic extensions 75 lying in the passage 32 need not be broken off from the liner where they join it, and, as a result, of course, there is no interruption in the "skin" on a "functional" liner surface 25. For the purpose of this description, a "functional" liner surface is one which is exposed to controlled fluid or to the clamping of the diaphragm or to the clamping of the adjacent pipe section.

In the prior art arrangements which I have actually seen in the field the gating of the injected plastic has been accomplished through one or more of the mandrels 50, 52, or 54, for example through the center of mandrel 50 (on axis 34 in FIG. 4). Such prior art arrangements resulted in having to break the plastic "gate" from the liner at surface 25, for example at point 25a in FIG. 6 in order to remove the mandrel. Since this point is on the plastic surface against which diaphragm 44 is to be squeezed to close the valve, and since the break was always rougher than the rest of such surface, some machining work was almost always required to smooth the break and make it flush with the rest of seating. In a few cases the breaks have actually left slight depressions below the general surface level. These depressions cannot be repaired by machining, and the result has been a spoiled body. Even when machined flush the break off of the plastic extension in the prior art has destroyed the continuity of the characteristic "skin" which exists at the surfaces of many of the thermoplastics and which is harder and tougher than the body of plastic underneath.

By having the plastic gates (in passages 30 and 32) enter from the back side of the liner, no break off is necessary except at the nozzle level 80 which is far enough away to have no effect on the liner.

In addition the invention, as examplified in FIG. 6, makes it easier to remove the mandrels after injection because the removal force need only be great enough to overcome the friction grip of the cooled plastic on the mandrel surfaces. No additional force is needed to break an extension of the liner material lying in a gate passage. Also the plastic extensions in passages 30 and 32 tend to anchor the liner against the interior casing surfaces 24, opposing the shrinkage and other forces tending to draw the liner away.

Figure 8:
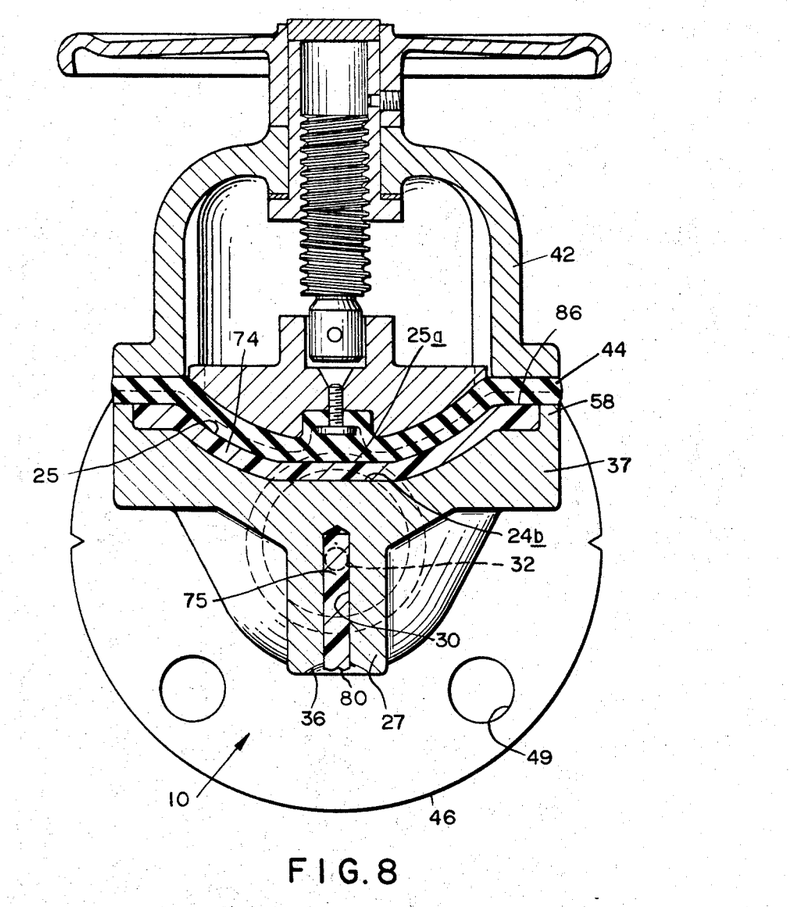
FIGURE 8 is a view like FIG. 3, but showing the plastic lining in place to complete the body and also showing the remaining valve parts assembled with this body, the valve being in the closed position.

The diaphragm 44, bonnet 42, the remaining parts of the valve and the pipe flanges 82, as shown in FIGS. 6 and 8, are conventional and serve to further illustrate the meaning of the phrase "functional" liner surface. Thus, in addition to the contact of the controlled fluid against the liner surfaces 25, and the contact of the diaphragm against the weir there are also liner surfaces 84 to which the diaphragm 44 is clamped and liner surfaces 86 to which the pipe flanges 82 are clamped.

The pipe itself is, of course, lined with some suitable plastic at 88 (probably the same plastic), and a gasket 90 may be used to provide additional sealing for the connection. The liner surfaces 84 and 86 are also "functional" because they must be smooth (to receive the diaphragm 44 and gasket 90, respectively) and because of the possibility that the controlled fluid may penetrate across substantial portions of them.

*Example*

An example of one practicing of the method of the present invention is as follows: A gray cast iron body casing of the kind, and with the general proportions, shown in FIGS. 1 to 3 has a ¼ inch diameter hole 30 drilled into hub 27 to about the level of axis 28 but not completely through to the interior casing surface 24b. Next a similar ¼ inch diameter hole 32 was drilled through the weir 26 from one sloping face 24a thereof to the other, parallel to axis 28 and intersecting hole 30. This later drilling was accomplished through one of the casing end openings 16 or 18. Next the nozzle receiving surface 36 was prepared on the outer end 94 of hub 27 around the entrance to passage 30. Next mandrels like 50, 52 and 54 were coated with a mold release compound and fitted into the body casing with accessories 68, 48 and 72. Next the casing and mandrels thus assembled were mounted in special fixtures 60–61 in a model RS–24–350 injection molding machine made by Farrel Corporation of 565 Blossom Road, Rochester, N.Y. A holding force was exerted in the direction of arrow 62 to grip the casing-mandrel assembly. The amount of this force is not a critical part of this invention. Those skilled in the injection molding art will understand what holding forces are required in accordance with the size of the casing and the plastic being injected. Next pure polypropylene plastic which had been introduced into the machine hopper in pellet form was plasticized by heating to a temperature of about 400° F., and a nozzle like 66 was advanced into contact with surface 36. Then the plastic was injected through the nozzle and into passage 30 and thence into passage 32 and throughout the spaces 56. The force of nozzle 66 on surface 36 and the injection pressure are not critical parts of this invention. Those skilled in this art will understand what forces and pressures are required depending on the size of the casing and the kind of plastic. Next the injection pressure was released and nozzle 66 was withdrawn while the plastic in passage 30 was still soft, separating the plastic in the passage from the plastic in the nozzle at level 80 (see FIG. 6). Next the casing-mandrel assembly was withdrawn from the injection molding machine. Next this assembly was allowed to air cool to approximately room temperature, and finally the mandrels were removed from the metal body casing leaving the plastic lining and the plastic filled passages 30 and 32.

I claim:
1. In a lined diaphragm valve body having:
    (I) a generally cylindrical hollow casing which:
        (A) is made of a rigid material,
        (B) has two end openings,
        (C) has walls which:
            (1) extend between said openings,
            (2) have interior surfaces defining a chamber,
            (3) have exterior surfaces defining the outside of the body,
            (4) have portions which:
                (a) are located on the inside of said casing,
                (b) are substantially midway between said openings,
                (c) have their interior surfaces concavely curved in converging relation to form a weir having a narrow top seating surface and sloping sides,
    (II) a liner which:
        (A) is made of different less rigid material,
        (B) covers said interior wall surfaces and weir in substantial contact therewith, improvements comprising:
  (III) said wall portions having:
    (A) their convex exterior surfaces spaced to locate an outwardly projecting boss which is substantially aligned with said weir,
    (B) a gate duct which:
      (1) extends through said boss and divides interiorally into a plurality of passages to said interior surfaces,
      (2) has its interior and exterior end openings at said interior and exterior surfaces, respectively, of said casing wall portions,
  (IV) said liners having extensions which:
    (A) are integral with said liner at said interior end openings of said passages,
    (B) fill said duct substantially to an exterior end opening thereof,
whereby said weir enables the use of a boss and ducts therethrough to anchor the liner to the narrow top seating surface and sloping sides thereof.

References Cited

UNITED STATES PATENTS

| | | |
|---|---|---|
| 3,093,864 | 6/1963 | Waldron et al. |
| 3,206,530 | 9/1965 | Boteler _____________ 137—375 X |
| 2,568,274 | 9/1951 | Clark. |
| 2,677,149 | 5/1954 | Fineran _____________ 151—7 XR |
| 713,052 | 11/1902 | Bordo et al. _________ 137—375 |
| 2,904,060 | 9/1959 | Fausek et al. _______ 251—357 XR |

FOREIGN PATENTS

| | | |
|---|---|---|
| 647,005 | 8/1962 | Canada. |
| 824,403 | 12/1959 | Great Britain. |

HENRY T. KLINKSIEK, *Primary Examiner.*